(12) United States Patent
Ravuna et al.

(10) Patent No.: US 12,463,965 B2
(45) Date of Patent: Nov. 4, 2025

(54) ONLINE AUTHENTICATION FOR MEDICAL DEVICES

(71) Applicant: BIOSENSE WEBSTER (ISRAEL) LTD., Yokneam (IL)

(72) Inventors: Eliyahu Ravuna, Kiryat Ata (IL); Or Yaacobovich, Metula (IL); Hue Nguyen, Fountain Valley, CA (US)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 338 days.

(21) Appl. No.: 17/901,253

(22) Filed: Sep. 1, 2022

(65) Prior Publication Data
US 2024/0080315 A1  Mar. 7, 2024

(51) Int. Cl.
*H04L 9/40* (2022.01)
*G16H 40/20* (2018.01)
*H04L 9/08* (2006.01)

(52) U.S. Cl.
CPC ......... *H04L 63/0838* (2013.01); *G16H 40/20* (2018.01); *H04L 9/0866* (2013.01); *H04L 63/0442* (2013.01); *H04L 2209/88* (2013.01)

(58) Field of Classification Search
CPC ............. H04L 2209/88; H04L 63/0442; H04L 63/0838; H04L 9/0866; G16H 40/20
USPC .......................................................... 726/6
See application file for complete search history.

(56) References Cited

U.S. PATENT DOCUMENTS

| | | | |
|---|---|---|---|
| 10,318,957 B2* | 6/2019 | Phillips | H04L 9/3226 |
| 10,423,775 B1 | 9/2019 | Kane-Parry | |
| 10,516,536 B2* | 12/2019 | Rommel | G06F 21/35 |
| 2009/0203973 A1* | 8/2009 | Donoghue | G16H 10/60 600/301 |
| 2011/0202988 A1* | 8/2011 | Otranen | H04L 9/3213 726/8 |
| 2014/0101453 A1* | 4/2014 | Senthurpandi | G06F 21/32 713/172 |

(Continued)

FOREIGN PATENT DOCUMENTS

| | | |
|---|---|---|
| WO | WO2020176110 A1 | 9/2020 |
| WO | WO2021122440 A1 | 6/2021 |
| WO | WO2022048701 A1 | 3/2022 |

OTHER PUBLICATIONS

International Search Report for corresponding PCT Appln. No. PCT/IB2023/058218 dated Nov. 28, 2023.

*Primary Examiner* — David P Zarka
(74) *Attorney, Agent, or Firm* — Clayton, McKay & Bailey, PC

(57) ABSTRACT

A medical device includes a QR generator and a user access/activity log. The QR generator generates a QR code at least from a username of a user and at least one OTP (one-time password) for the user and enables access of the user to the medical device upon receiving an OTP from the user. The user sends the QR code to an online authorization server for the medical device for decryption upon authentication of the user. The log lists user activity once the user is authenticated by the server. The server receives the QR code, which includes at least an encrypted text containing at least the OTP and a user identification, and decrypts the encrypted text using a private key associated with the medical device. The authorization server enables the user to log in for authentication and, if authenticated, displays the at least one OTP to the user.

12 Claims, 5 Drawing Sheets

(56) References Cited

U.S. PATENT DOCUMENTS

| | | | |
|---|---|---|---|
| 2014/0351589 A1* | 11/2014 | Chenna | H04W 12/068 |
| | | | 713/168 |
| 2017/0063836 A1* | 3/2017 | Cui | H04L 63/0884 |
| 2020/0322793 A1* | 10/2020 | Yang | H04L 9/0869 |
| 2021/0382996 A1* | 12/2021 | Jeansonne | H04L 9/0825 |
| 2022/0103545 A1* | 3/2022 | Hebert | H04L 63/1491 |
| 2022/0385485 A1* | 12/2022 | Liu | H04L 9/3247 |
| 2023/0075296 A1* | 3/2023 | Morley, III | H04L 63/0807 |
| 2024/0031133 A1* | 1/2024 | Cameron | H04L 9/3271 |

* cited by examiner

ONLINE AUTHENTICATION FOR MEDICAL DEVICES

FIELD OF THE INVENTION

The present invention relates to user authentication in general and to user authentication on medical devices in particular.

BACKGROUND OF THE INVENTION

Many typical modern devices are connected to the Internet and allow a user to login against an online database of users. This is true, for example, for most office computers, smartphones, smart TVs, etc. There are, however, other devices that either may not be connected to the internet or, if connected, do not have access to a database capable of authenticating certain users. For example, some hospitals are reluctant to connect their medical devices, such as ultrasound machines, electrocardiogram machines, MRI (magnetic resonance imaging) machines, mechanical ventilators, robotic surgical systems, etc., to the Internet, to maintain the security of the devices as well as patient confidentiality. Of, if such devices are connected to the internet, they may be connected behind firewalls or to database systems that contain credentials of some necessary users (e.g., hospital personnel) but not others, e.g., technicians or third-party personnel. For example, technicians sent by the medical device manufacturer or hospital users may need to be authenticated, ideally in a user-friendly way, against an online user directories controlled by those entities or third-parties.

U.S. Pat. No. 10,516,536 to Siemens Healthcare GmbH, PCT Publications WO2021/122440 to Gambro Lundia AB, and WO2020/176110 to Hewlett-Packard discuss authenticating technicians and/or users, and generally follow a method shown generally in FIG. 1, to which reference is now made. A user 10 may request access to a medical device 12 at a hospital 14. In response, medical device 12 displays a QR code on a screen 16.

User 10 opens a web site or an application on a smartphone or another mobile device 18 and scans the QR code. The web site or application may connect, via the Internet 19, to an authorization server 20. Either the application on the mobile device 18 or the server 20 issues a one-time password (OTP) to user 10. User 10 then enters the OTP to medical device 12, granting access to user 10.

SUMMARY OF THE PRESENT INVENTION

There is therefore provided, in accordance with a preferred embodiment of the present invention, a medical device including a QR generator and authorizer and a user access/activity log. The QR generator and authorizer generates a QR code at least from a username of a current user and at least one randomly generated OTP (one-time password) for the current user and enables access of the current user to the medical device upon receiving the at least one OTP from the current user. The current user sends the QR code to an online authorization server for the medical device for decryption upon authentication of the current user. The user access/activity log lists activity of the current user according to the username once the current user is authenticated by the online authorization server.

Furthermore, in accordance with a preferred embodiment of the present invention, the QR generator and authorizer includes a public key encryptor to encrypt information for the QR code.

Moreover, in accordance with a preferred embodiment of the present invention, the information includes a randomly generated OTP, and a requested access level, and the authorization server displays the OTP if the current user has permission for the requested access level.

Alternatively, in accordance with a preferred embodiment of the present invention, the information includes multiple randomly generated OTPs, each for a different access level, and the authorization server displays a selected one of the OTPs related to an access level of the current user.

Further, in accordance with a preferred embodiment of the present invention, the information includes the username and/or an expiration time.

Alternatively, in accordance with a preferred embodiment of the present invention, the information is appended to a URL (universal resource locator) of the authorization server as query parameters.

Further, in accordance with a preferred embodiment of the present invention, the information includes a serial number or a key ID of the medical device.

There is also provided, in accordance with a preferred embodiment of the present invention, an authorization server for a medical device. The server including a QR code receiver, a QR code decryptor, and a user authenticator. The QR code receiver receives a QR code from a mobile device of a user for the medical device. The QR code provides at least an encrypted text, where the encrypted text contains at least an OTP, and a user identification. The QR code decryptor accesses the private key associated with the medical device and uses the associated private key to decrypt a public-code-encrypted portion of the QR code into at least a username of the user and at least one OTP for the user. The user authenticator enables the user to log in to the authorization server for authentication and displays at least one OTP if the user successfully logs into the server.

Moreover, in accordance with a preferred embodiment of the present invention, the server also includes a permission database listing a multiplicity of users and their associated permission levels. The user authenticator selects one OTP from among the at least one OTP according to the associated permission level of the user.

In accordance with a preferred embodiment of the present invention, the QR code includes a serial number or a key ID of the medical device and the private key associated with the medical device is associated with the serial number or with the key ID.

Finally, in accordance with a preferred embodiment a system comprises a medical device and an authentications server configured as described above and herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
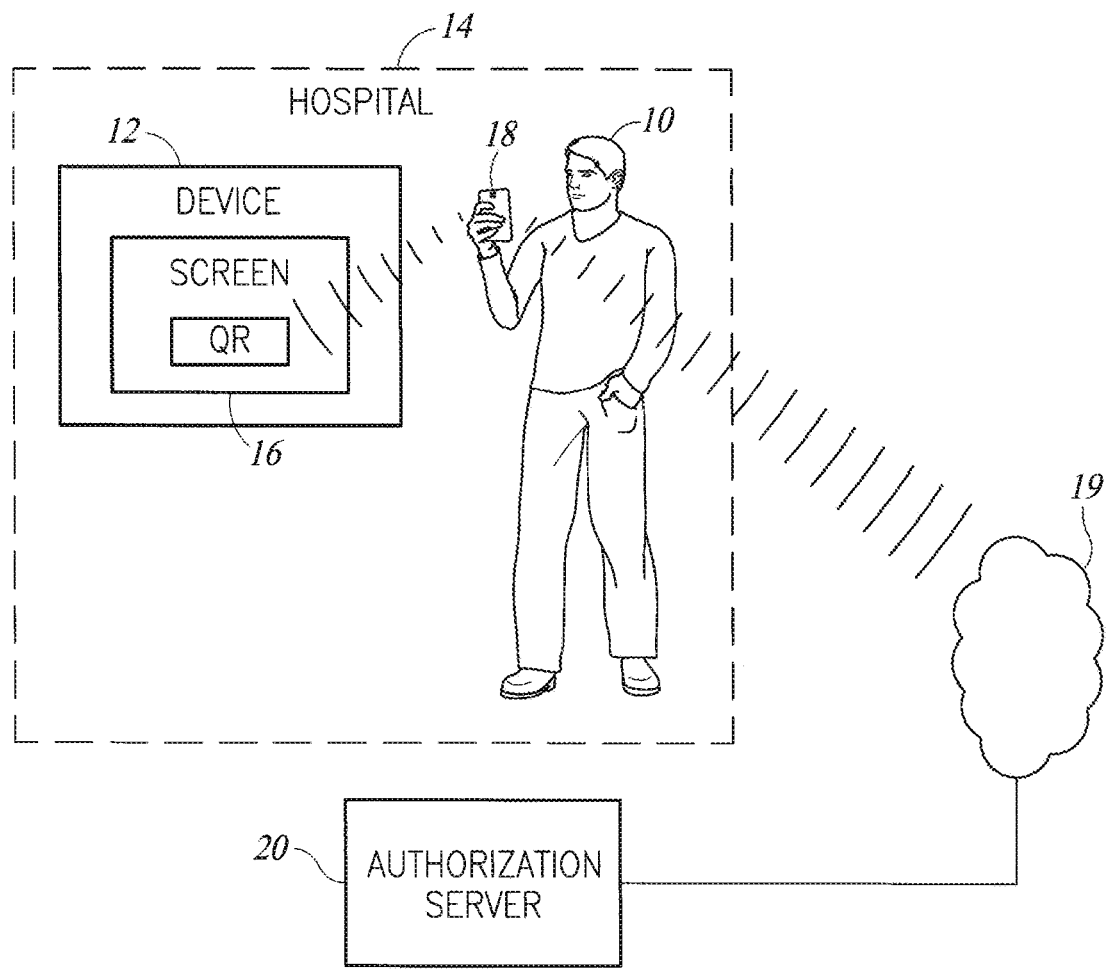
FIG. 1 is a schematic illustration of a prior art user authentication method.

For simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous details are set forth to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a user-friendly way to authenticate technicians sent by the medical device manufacturer is against the corporate login page of the medical device manufacturer, whereas a user-friendly way to authenticate hospital users is against the corporate login page of the hospital.

Moreover, Applicant has realized that there is a need for an audit trail with usernames on the medical device. Such an audit trail is not possible in the prior art where the medical device knows only whether or not the user is authorized, but does not know who the user is (i.e. doesn't know the user's username or other identifying information).

Applicant has realized that, for user authentication on devices to be effective, some or all of the following elements ideally should be part of the process:
1) User authentication against an online database of users;
2) an audit trail on the medical device storing usernames and user access levels;
3) a one-time password;
4) non-repudiable logs of user activity on stored the medical device; and
5) a process that remains secure even if a hacker were to gain access to the medical device.

Figure 2:
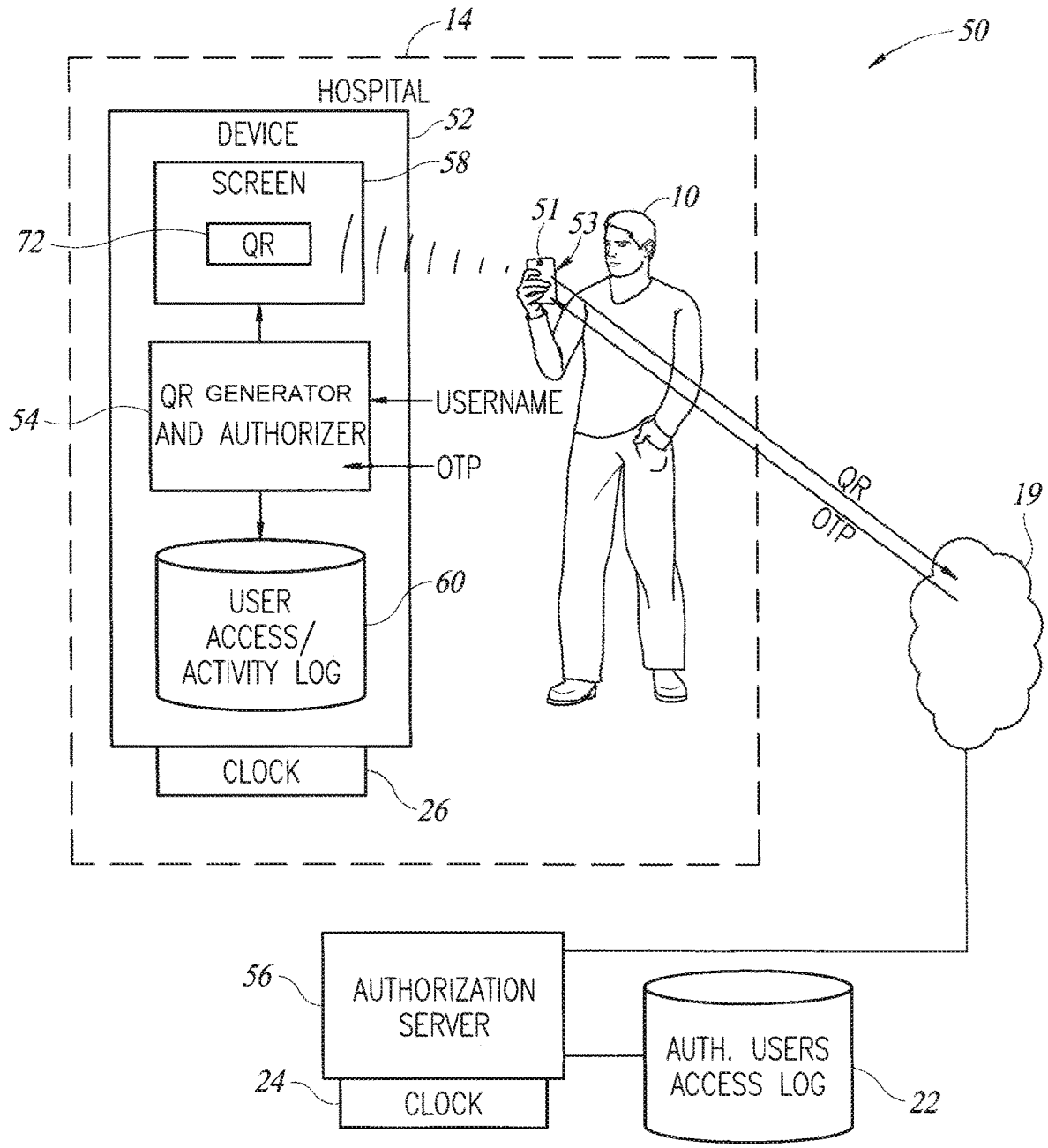
FIG. 2 is a schematic illustration of a system for authentication of users for medical devices using an online database of users, constructed and operative according to a preferred embodiment of the present invention.
Figure 3A:
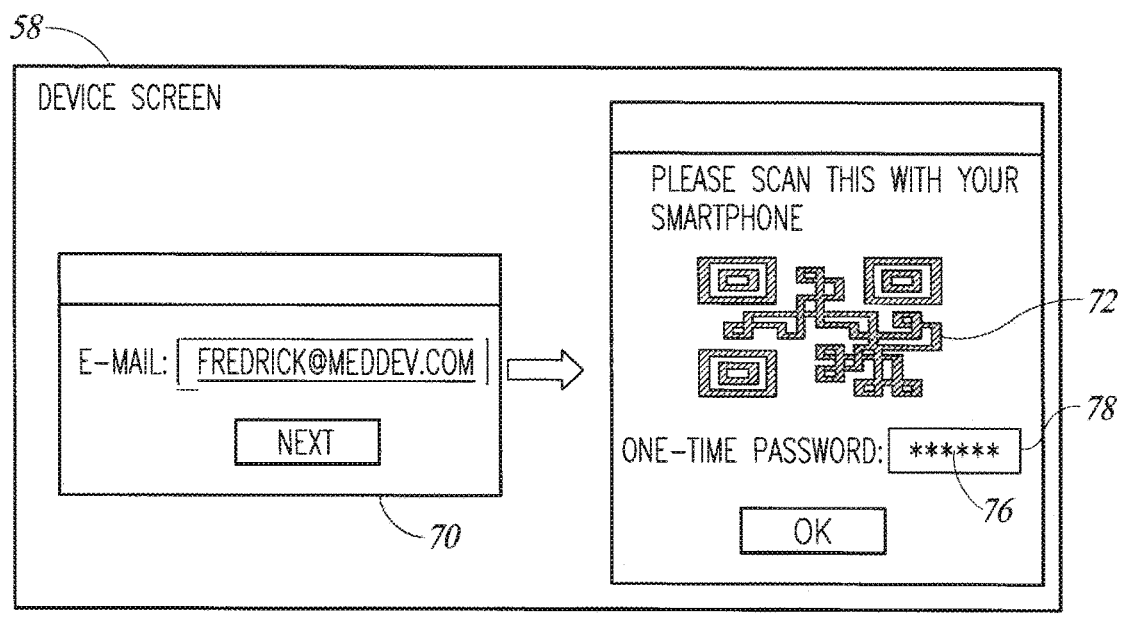
FIGS. 3A and 3B are schematic illustrations of screens produced by the system of FIG. 2.
Figure 3B:
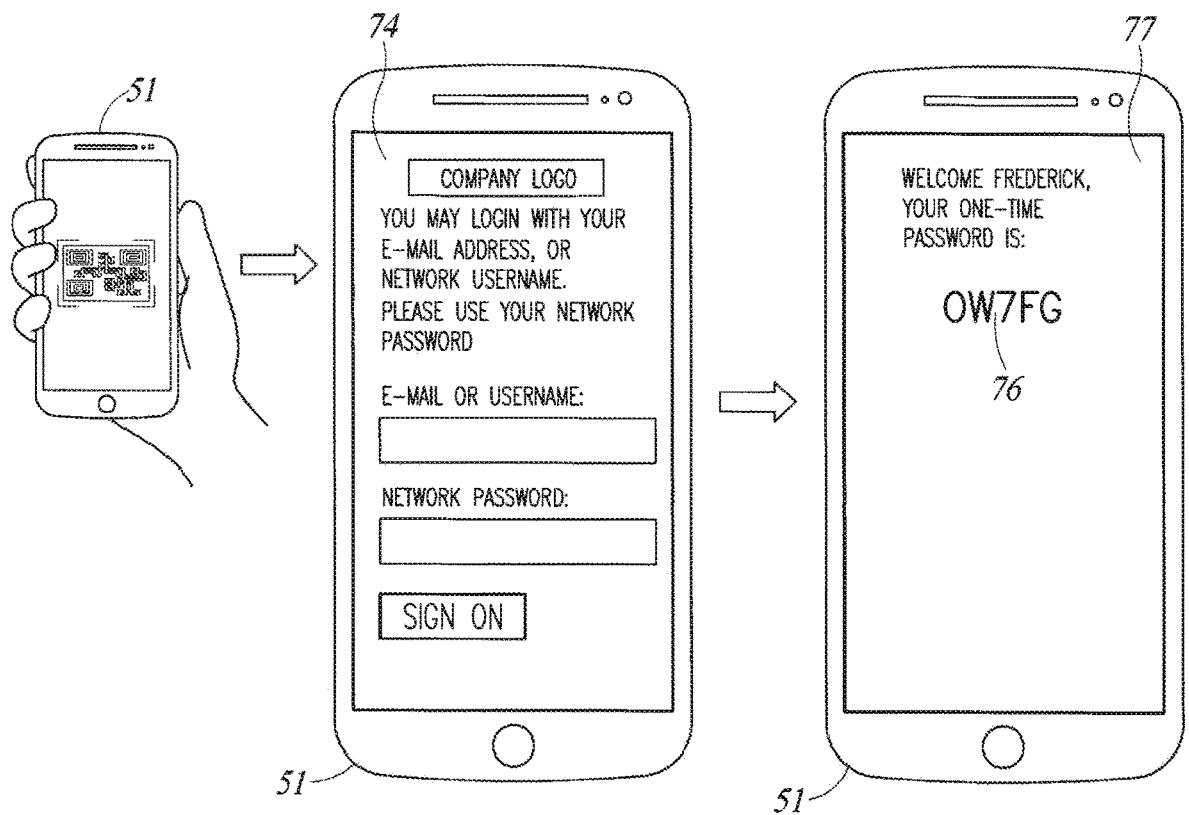

Reference is now made to FIG. 2, which illustrates an example system 50 for authentication of users for medical devices 12 using an online database of users. System 50 comprises a mobile device, here a smartphone 51 having an application 53 thereon capable of accessing the internet (e.g., a web browser or stand-alone application), and a medical device 12 having a token generator and authorizer 54 In this example, the token generator employed is a QR-code generator. However, other embodiments of the invention may employ alternative token generators to perform the functionality described herein, whether by optical or non-optical means. Alternatives include but are not limited to one-dimensional barcodes, SnapTags, near-field communication (NFC), and Bluetooth. It will be understood in the case of wireless means, such as NFC, that the act of scanning a code as described in reference to the examples herein would instead involve triggering communication between the mobile device and medical device via embedded circuitry in the respective devices associated with the relevant communication protocol (e.g., a near-field communication chipset or integrated circuit configured to transmit and receive wireless communication). Reference is also made to FIGS. 3A and 3B, which illustrate the screens seen by user 10 in this example.

In system 50, when user 10 wants to login to a medical device 52, user 10 must first type in a username, such as his/her e-mail address, to QR generator and authorizer 54, such as via a window 70 (FIG. 3A) on a medical device screen 58 (FIG. 2). It is noted that the terms "token generator" (and its species, "QR generator") and authorizer, used herein as nouns, should be understood to refer to functional blocks of software code, which have instructions that cause a processor of the medical device to execute actions associated with the noun, e.g., generating a QR code in the case of a QR generator. QR generator 54 may then generator a QR code 72 (FIG. 3A) based at least on the received username and may display the resultant QR code 72 on screen 58. User 10 may scan the QR code either with a specialized application 53 (FIG. 2) on smartphone 51, or, alternatively, the QR code may contain a URL (universal resource locator) that forwards the user to an application on the cloud, for example, to an hops address with some query parameters. In the latter case, the user can use any generic QR code scanner application on his/her smartphone. In both cases, the application brings establishes communication between the mobile device 51 the authorization server 56 (FIG. 3), which may cause the mobile device to display the corporate login page 74 (FIG. 3B) of the hospital or of the manufacturer of the medical device 52. User 10 may then log into authorization server 56 via login page 74. After successful authentication, authentication server 56 may retrieve an access level of user 10 from the online database of users, and may issue a corresponding OTP (one-time password) 76 to user 10, displayed on smartphone 51, which user 10 may then input to the mobile device via a via a field 78 (FIG. 3A) on window 72. From OTP 76, QR generator and authorizer 54 (FIG. 2) may determine the permissions of user 10 as a function of the entered OTP, and may grant access accordingly. Medical device 52 may then log all activity of user 10 on medical device 52 in an access/activity log 60.

It will be appreciated that access/activity log 60 may associate the access information with the username of each user 10 and thus, it will be possible to determine, from information in medical device 52 alone, the actions performed by each user, without the need to look into the access log 22 of authorization server 56.

Figure 4:
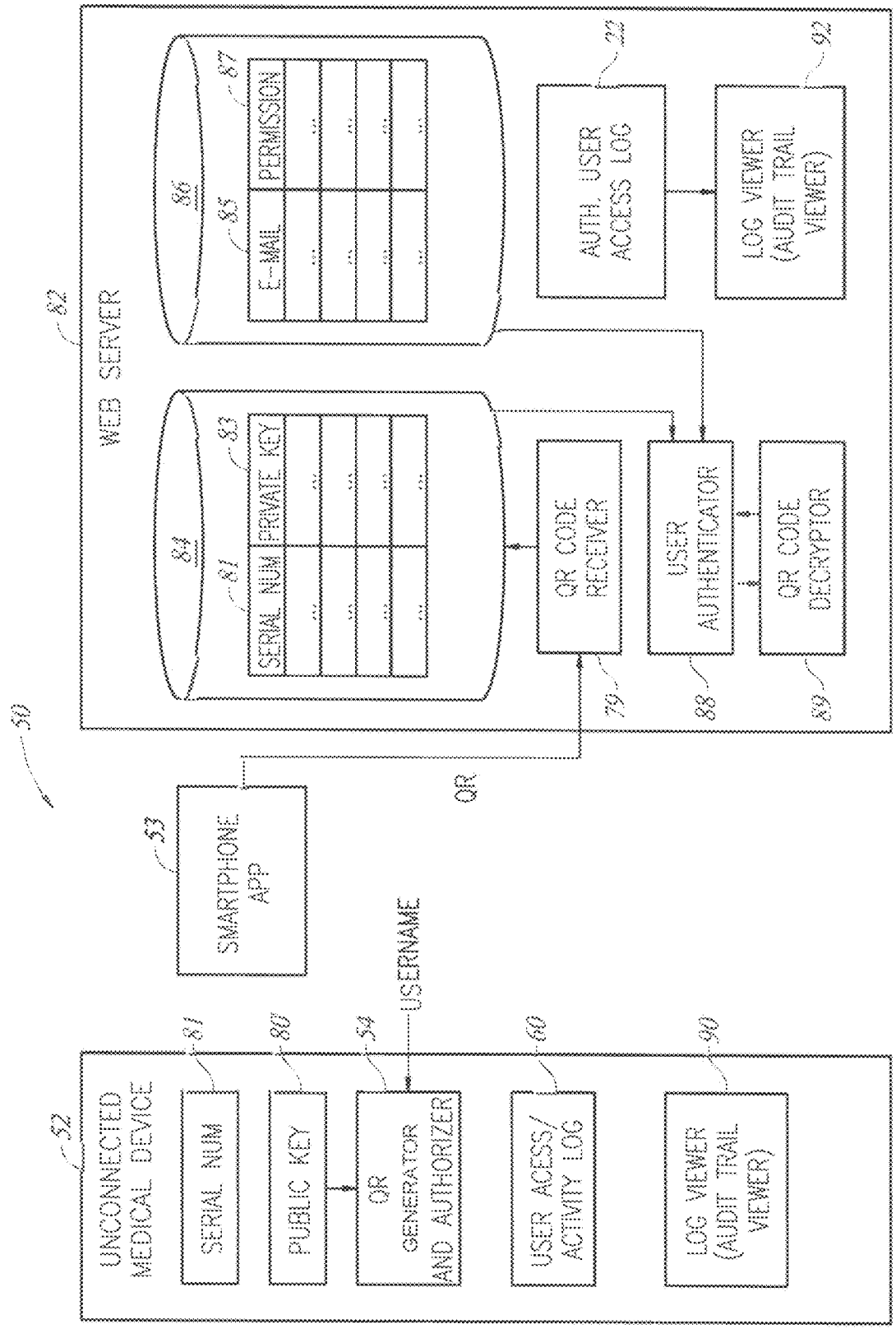
FIG. 4 is a schematic illustration of elements of the system of FIG. 2.

Reference is now made to FIG. 4, which details the elements of system 50, and to FIG. 6, which details the method implemented by system 50.

In the factory, each medical device 52 may be issued a private/public key pair, which may be generated by any known asymmetric encryption algorithm, such as the RSA algorithm, where each medical device 52 may be shipped with the public key, labeled 80 (FIG. 5), as well as a serial number 81, stored therein. The corresponding private key 83 is known solely to a web server 82 of the manufacturer, and may be stored in a private key database 84 listing private keys 83 with their associated serial numbers 81. Web server 82 may maintain private keys 83 secret, using them only as described below. For example, to maintain the private keys secret, web server 82 may store them in hardware security modules (HSM), such as HSM devices compliant with the Federal Information Processing Standard Publication 140-2 (FIPS PUB 140-2) level 3 (or higher) standard. In this case, private key database 84 may store pointers to the HSM, instead of the private keys themselves.

Web server 82, which may be authorization server 56 for the manufacturer and may be in contact with an authorization server 56 of the hospital for hospital users, may also have a permission database 86 which may store permissions 87 of currently authorized users 10 with their associated usernames 85, which may be email addresses or any other type of username.

Medical device 52 only knows its public key. Therefore, even if a hacker reverse-engineers all cryptographical keys and algorithms encoded in medical device 52, s/he still cannot login since he lacks the private key stored in private key database 84 of web server 82.

Figure 5:
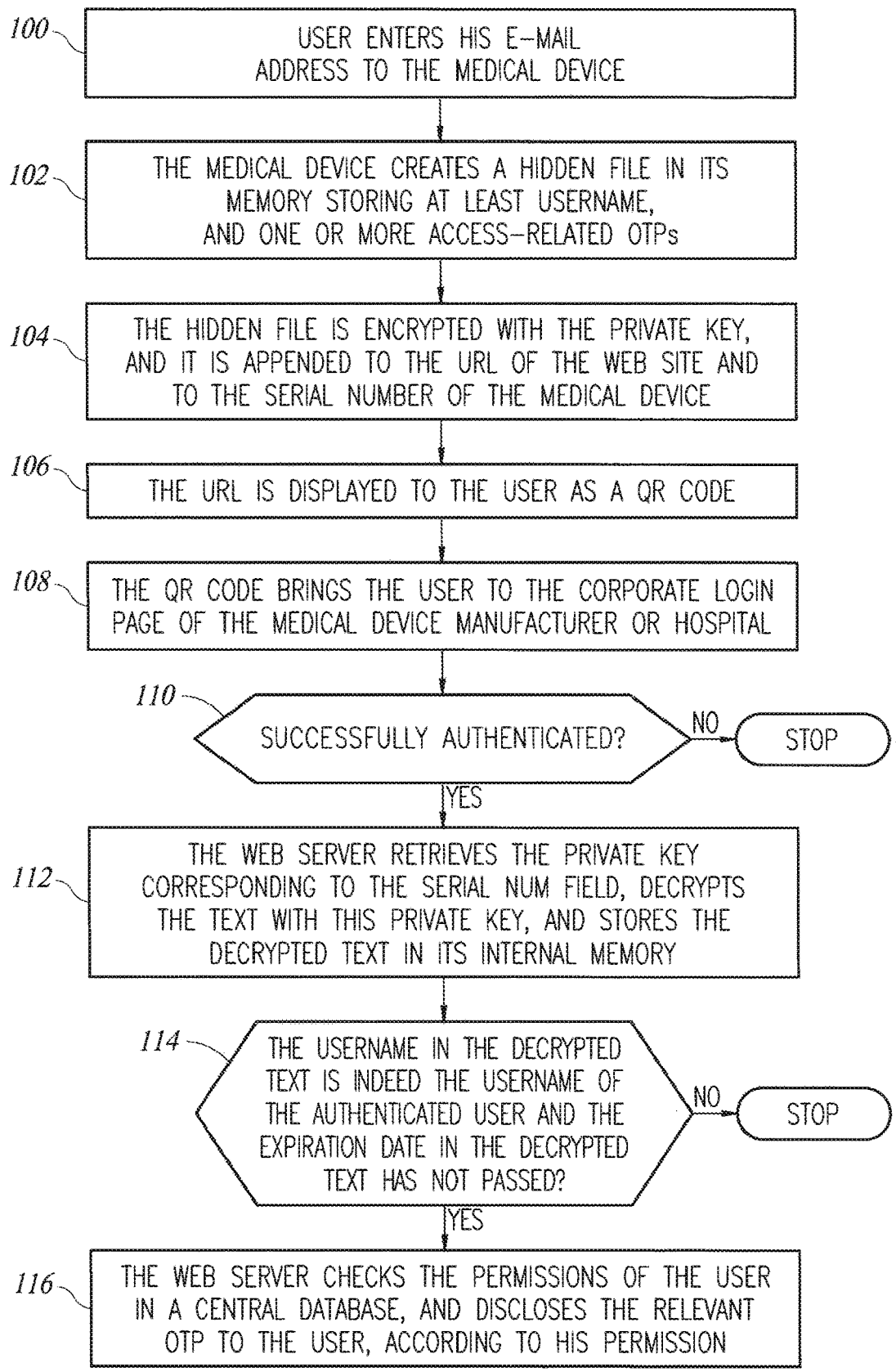
FIG. 5 is a flow chart illustration of a method implemented by the system of FIG. 2.

FIG. 5 illustrates an embodiment where a different private/public key pair is generated for each medical device 52. This ensures that if the private key of a single medical device is compromised, other medical devices still stay protected, In an alternative embodiment, a single private/public key pair may be used for all medical devices in the field as long as private key 83 is well protected, preferably inside a FIPS 140-2 level 3 (or higher) compliant HSM module. With this proviso, user access/activity log 60 may still be non-repudiable, and resistant to reverse-engineering.

Each medical device 52 may comprise QR generator and authorizer 54, user access/activity log 60 and log viewer (audit trail viewer) 90 for administrators to view log 60 to determine actions, usernames who performed these actions, and the timing of these actions. For example, administrators may determine who logged in, who changed calibration files, who deleted a study, and when these actions took place.

Web server 82 may comprise a QR code receiver 79 to receive the QR code from smartphone app 53, a user authenticator 88 to authorize the users and to log the authorizations in authorization log 22 and a QR code decryptor 89 to decrypt the QR code, as described hereinbelow. Web server 82 may also comprise a log (audit trail) viewer 92 for administrators to see information, such as the one-time password (OTP) requests, the timings of these requests, the medical device serial numbers for which the requests are made, and the list of the allowed and denied requests.

In some embodiments, the QR code may contain a URL address with query parameters where all required information may be embedded in its query parameters. In this case, QR code receiver 79 may receive all the information in the query parameters of the URL without the need to decode it.

When user 10 requests to login to medical device 52, QR generator and authorizer 54 may request his/her e-mail address (or username), and optionally his/her requested access level (step 100 of FIG. 6). In an embodiment, user 10 may specify his/her requested access level by choosing one of the options "technician", "physician" or "nurse" in a multiple-selection box in a graphical user interface of medical device 52. By providing the access level of the user, medical device 52 may be able to enable different permission levels. For example, the technician may be allowed to do calibration tasks, but may not have access to patient names, while the physician and the nurse may be exposed to patient names, but they may not have access to perform technical maintenance tasks on medical device 52.

In response, QR generator 54 may generate (step 102) a hidden file in a volatile memory of medical device 52, storing at least the username, and one or more randomly generated access-related OTPs. Optionally, the hidden file in volatile memory can also contain a calculated expiration time.

For example, user 10 may have an e-mail address of alice@jnj.com and may request to login with the "technician" access level. In this example, the hidden file in the volatile memory of the medical device may look like:

---
Username: alice@jnj.com
RequestedAccessLevel: Technician
ExpireTime: 10.Jan.2022, 15:23.23
OTP: 759356

---

QR generator and authorizer 54 may calculate the ExpireTime field as 'NOW+some constant duration', for example, 'NOW+15 minutes'. The expire time may enable web server 52 to give a meaningful error message if the user tries to get an OTP after the expire time. Alternatively, QR generator and authorizer 54 may be designed to refuse the OTP after some predetermined amount of time. Therefore, even in this alternate embodiment, medical device 52 may be secure, and still resistant to replay attacks, even without the expire time in the hidden file.

QR generator and authorizer 54 may generate the OTP by using a cryptographically strong random number generator function. The OTP may be composed of numeric and/or alphabetic characters and/or symbols. The OTP preferably should be short enough to be easily typed by user 10, although longer and more complex OTPs are possible.

QR generator and authorizer 54 may encrypt (step 104) the hidden file with its public key 80, and may build a URL that points to web server 82, with the encrypted hidden file and optionally the serial number 81 of medical device 52 as query parameters of the URL. QR generator and authorizer 54 may encode (step 106) the URL in a QR code 72 (FIG. 4A). Even if someone were to decode QR code 72, the only information available would be the URL, which includes the encrypted version of the hidden file, and optionally, a serial number 81. The hidden file, which was encrypted with public key 80, can only be decrypted with private key 83, which only web server 82 has access to. Thus, no one can discover the OTP encoded inside QR code 72. RSA, Elliptic Curve Cryptography (ECC) or any other asymmetrical algorithm may be used for the key generation, data encryption and decryption.

The user may scan QR code 72 with a general-purpose camera application on smartphone 51, and the general-purpose camera application may forward a web browser in smartphone 51 to the URL address encoded in QR code 72, which may be hosted on the authentication web server 82, with the specified query parameters. For example, the URL may look like this:

---
http://www.manufacturer.com/Login?encryptedString=A47BF4CD3455FFADBC34C14A4987BDD34
5A4BF24344F44CD34A51A34A4BF43CD355443BC33334C12A987BD2356442012A5B345F8CC97
D3453B5C34C314A6945687098B4A474B4F43CD338A945DCB7FF7638943975203948BDA98374F
C&MedicalDeviceSerialNumber=555123

---

Alternatively, QR code 72 may contain the encrypted version of the hidden file and optionally the serial number 81 of medical device 52 in some other format, for example XML, JSON or a proprietary file format. In this case, a specialized application may be installed on smartphone 51 in order to read QR code 72 and forward it to QR code receiver 79.

Authentication web server 82 may authenticate the user via a corporate login page (step 108). For example, web server 82 may determine whether the user is a technician employed by the medical device manufacturer or a hospital user by looking to the domain part of user's e-mail address. Or, for example, if the requested access level is "technician", the web server 82 may assume the user is a technician employed by the manufacturer, whereas if the requested access level is either "physician" or "nurse", the web server 82 may assume this is a hospital user. If the user is a technician employed by the medical device manufacturer, web server 82 may forward him/her to the corporate login page of the manufacturer. If the user is a hospital user, web server 82 may forward him/her to the corporate login page of the hospital. Web server 82 and the corporate login page may communicate via authentication protocols, such as OpenID, OAuth 2.0 or SAML. Upon successful authentication, the corporate login page may send the user back to web server 82, and web server 82 may send the encrypted hidden file, and optionally the serial number of medical device 52, to QR code decryptor 89. The process continues with step 112.

In another embodiment, the user may scan QR code 72 with a smartphone application specifically developed for the purpose of this invention. In this case, QR code 72 may include the encrypted hidden file and optionally the serial number of medical device 52 in any format, such as XML, JSON or a proprietary file format. In this case, the smartphone application may authenticate the user either before or after scanning the QR code. Once the application successfully authenticates the user, and QR code 72 has been scanned, the process continues with the step 112.

In step 112, QR code decryptor 89 may access private key database 84 to find the private key 83 associated with the transmitted serial number 81. Alternatively, if all medical devices are shipped with the same private/public key, QR code decryptor 89 may use the constant private key 83 to decrypt the string in QR code 72. If private key 82 is stored in an HSM, QR code decryptor 89 doesn't need to receive private key 83; instead, QR code decryptor may send a decrypt command to the HSM along with the hidden file and may receive the decrypted hidden file back from the HSM. Then, QR code decryptor 89 may send the now-decrypted hidden file to user authenticator 88.

In step 114, user authenticator 88 may verify that the Username field in the decrypted string matches the actual username of the user who authenticated to web server 82, for example via the corporate login page. And user authenticator 88 may further verify, via permission database 86, that user 10 has indeed permission for the access level specified in the RequestedAccessLevel field, and may verify that the ExpireTime field is in the future, based on its clock 24 (FIG. 3). If all the conditions are satisfied, user authenticator 88 may display (step 116) the relevant OTP 76 (FIG. 4B) as a clear-text on an OTP page 77.

Upon seeing displayed OTP 76, user 10 may enter OTP 76 into QR generator and authorizer 54 on medical device 52, and QR generator and authorizer 54, after checking the entered OTP against the OTP field in the hidden file, may grant access to user 10 to perform all tasks allowed in his/her access level.

It will be appreciated that system 50 is resistant to replay attacks because every time the user requests an OTP, the associated QR code 72 will be different, since the OTP encrypted in QR code 72 is randomly generated, and thus, the associated QR code 72 is different on every login attempt.

In an alternative embodiment, each medical device 52 may be shipped with the same public key. In this case, as mentioned hereinabove, a single private key 83 is sufficient on web server 82. However, when all medical devices 52 use the same public key 80, it is desirable to enable a method to replace the key from time to time, for example after a few years, or when a new version of medical device 52 is released to the market, or if private key is compromised.

To make the replacement of the keys possible, each private/public key pair may be assigned an ID. At first, all medical devices 52 will be shipped with a public key 80 with ID=1. In order to signal to web server 82 which public key 80 to use, medical device 52 will encode in QR code 72 (or in the query parameters of the URL, which is encoded in the QR code) the ID of the public key used in the encryption, alongside the encrypted hidden file.

After a few years, the manufacturer may begin deploying medical devices with a new public key with ID=2. At that point in time, there will be two types of medical devices in the field. Those still with the old public key with ID=1, and those with the new public key with ID=2. In this case, web server 82 will select the appropriate private key 83 for decryption according to the key ID that comes inside the QR code or inside the query parameters of the URL.

When the manufacturer decides to decommission the old public key with ID=1, the private key with ID=1 will be removed from the database of web server 82 or from the HSM. After this removal, the authentication functionality won't work for medical devices 52 with the old public key with ID=1.

It can be appreciated that the "key ID" in this embodiment is very similar to the "serial number" of the previous embodiment. Both "key ID" and "serial number" instruct QR code decryptor 89 as to which private key to use to decrypt QR code 72. In embodiments with "serial numbers", there may be a separate private/public key pair per each individual medical device, whereas in embodiments with "key IDs", there may be one private/public key per each group of medical devices, for example, for all medical devices manufactured in the same year. However, the usage of the "key ID" and "serial number" may be similar.

In the previous embodiment, the user needed to specify which access level s/he requests In an alternative embodiment, user 10 may receive QR code 72 just by writing his/her username, without specifying any desired access level. In this embodiment, medical device 52 may create a different OTP for each possible access level in the system. In this embodiment, the hidden file may look like this:

---

Username: alice@jnj.com
ExpireTime: 10.Jan.2022, 15:23.23
OtpIfTechnician: 759356
OtpIfPhysician: 904154
OtpIfNurse: 184534

---

In this embodiment, QR generator and authorizer 54 may encrypt this version of the hidden file with public key 80 and web server 82 may decrypt the encrypted file to its internal volatile memory by using private key 83, without disclosing anything to user 10.

Assuming that web server 82 may have already authenticated user 10 via the corporate login page or via some other method, and since permission database 86 may list the permissions of user 10, web server 82 may select the relevant OTP (from the OtpIfTechnician, or OtpIfPhysician, or OtpIfNurse fields), according to the permission level of user 10.

For example, if user 10 is a physician, web server 82 may only disclose the OtpIfPysician field to the user as the OTP. User 10 may enter this OTP to medical device 52, and from this, medical device 52 may automatically determine that this person is a physician. Medical device 52 may grant permissions accordingly.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer-readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers, including commercial mobile devices and smart phones, may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A medical device comprising a processor and a storage medium having stored thereon instructions which, when executed by the processor, cause the medical device to:
   generate an authentication token based upon at least a username of a current user and a randomly generated one-time password (OTP) for said current user, wherein the authentication token is encrypted using a public key, the one-time password, and the username;
   present the authentication token to said current user, wherein presenting the authentication token causes a mobile device of said current user to transmit said authentication token to an online authorization server for said medical device, and, upon authentication of said current user, to decrypt the authentication token and cause the mobile device to display the one-time password to the user;
   enable access of said current user to said medical device upon receiving said OTP from said current user; and
   generate an access/activity log to track and store activity of said current user,
   wherein the generating the authentication token comprises generating a QR code,
   wherein said authentication token includes a requested access level, said authorization server to cause the mobile device to display said OTP if said current user has permission for said requested access level.

2. The medical device of claim 1 wherein said authentication token includes a second randomly generated OTP, each of said OTPs being associated with a different access level, said authorization server cause the mobile device to display one of said OTPs related to an access level of said current user.

3. The medical device of claim 1 wherein said authentication token also comprises an expiration time.

4. The medical device of claim 1 wherein said authentication token includes information that is appended to a universal resource locator of said authorization server as query parameters.

5. The medical device of claim 1 wherein said authentication token includes information comprising a serial number of said medical device.

6. The medical device of claim 1 wherein said authentication token includes information comprising a key ID of said medical device.

7. A medical device comprising a processor and a storage medium having stored thereon instructions which, when executed by the processor, cause the medical device to:
   generate an authentication token based upon at least a username of a current user and a randomly generated one-time password (OTP) for said current user, wherein the authentication token is encrypted using a public key, the one-time password, and the username;
   present the authentication token to said current user, wherein presenting the authentication token causes a mobile device of said current user to transmit said authentication token to an online authorization server for said medical device, and, upon authentication of said current user, to decrypt the authentication token and cause the mobile device to display the one-time password to the user;
   enable access of said current user to said medical device upon receiving said OTP from said current user; and generate an access/activity log to track and store activity of said current user, wherein the generating the authentication token comprises generating a QR code, wherein said authentication token includes information that is appended to a universal resource locator of said authorization server as query parameters.

8. The medical device of claim 7 wherein said authentication token includes a requested access level, said authorization server to cause the mobile device to display said OTP if said current user has permission for said requested access level.

9. The medical device of claim 7 wherein said authentication token includes a second randomly generated OTP, each of said OTPs being associated with a different access level, said authorization server cause the mobile device to display one of said OTPs related to an access level of said current user.

10. The medical device of claim 7 wherein said authentication token also comprises an expiration time.

11. The medical device of claim 7 wherein said authentication token includes information comprising a serial number of said medical device.

12. The medical device of claim 7 wherein said authentication token includes information comprising a key ID of said medical device.

* * * * *